United States Patent [19]

Bogomolov et al.

[11] 4,136,035

[45] Jan. 23, 1979

[54] APPARATUS FOR DEHYDRATION OF CONTINUOUSLY FED FLOW OF SUSPENSION

[76] Inventors: Boris N. Bogomolov, Pervomaiskaya ulitsa, 35/18, kv. 11, Moscow; Anatoly V. Kiselev, ulitsa imeni Gazety "Krasnoyarskyrabochy", 105-a, kv. 35; Alexandr N. Malafeev, ulitsa Akademika Pavlova, 88, kv. 8, both of Krasnoyarsk, all of U.S.S.R.

[21] Appl. No.: 819,138

[22] Filed: Jul. 26, 1977

[51] Int. Cl.² ............................................. B01D 33/00
[52] U.S. Cl. .................................... 210/388; 209/325; 209/438; 209/439; 210/DIG. 18; 210/DIG. 22
[58] Field of Search ............... 210/359, 384, 385, 388, 210/389, DIG. 18, DIG. 22; 209/325, 327, 329, 331, 333, 341, 346, 359, 360, 437, 438, 439

[56] References Cited

U.S. PATENT DOCUMENTS 2,420,652   5/1947   Chilowsky ........................... 210/388

FOREIGN PATENT DOCUMENTS 309917   7/1971   U.S.S.R.

*Primary Examiner*—Frank Sever
*Attorney, Agent, or Firm*—Robert E. Burns; Emmanuel J. Lobato; Bruce L. Adams

[57] ABSTRACT

Apparatus for producing various construct materials and comprises a vertical container converging from the top down and a vibrator. The container has pipes for feeding a suspension thereinto and discharging a thickened suspension, respectively, and filtering side walls for the passage of filtrate. The vibrator is mounted outside the container and has vibration transmitting planes extending substantially along the filtering side walls of the container in such a manner that they cooperate, during operation of the vibrator, with the filtering side walls to impart vibrations thereto. This facilitates continuous dehydration of the suspension without formation of cake on the filtering surface, whereby a high degree of filtration and a greater filtering rate are ensured.

9 Claims, 4 Drawing Figures

APPARATUS FOR DEHYDRATION OF CONTINUOUSLY FED FLOW OF SUSPENSION

BACKGROUND OF THE INVENTION

The invention relates to apparatus for the production of various construction materials, and more specifically, to apparatus for dehydration of continuously fed flow of a suspension, such as suspensions of cement slurry, ceramic dross and other finely divided aqueous suspensions. The invention may be most successfully used in various branches of the chemical industry and in metal production.

At present, there are widely known apparatus for dehydration of finely divided viscous suspensions using filtering, such as vacuum filters and filter presses. Vacuum filters comprise discs or drums having a filtering surface. Filtering in vacuum filters is effected by evacuating liquid from the suspension when the filtering surface is immersed in the suspension. A layer of dehydrated material is formed on the filtering surface which is referred to as cake.

Filter presses also comprise filtering surfaces. Filtering in the filter presses is effected by compressing the suspension between the filtering surfaces. The cake is also formed in this case.

Known apparatus are, however, very complicated in structure, they feature high metal consumption for their manufacture, exhibit large filtering surface area and high power requirements.

The above disadvantages are partially eliminated in the apparatus described in USSR Inventor's Certificate No. 309917.

In this apparatus, the suspension is dehydrated by combining vacuum and vibration actions. The apparatus has a vertical container provided with a pipe for feeding starting suspension at the top thereof and with a pipe for discharging thickened suspension at the bottom thereof. The vertical container is made converging in the direction of the suspension flow, and the side walls are made as filtering surfaces. The suspension being filtered flows through the inner space of the container between the filtering side walls, the inner space accommodates a vibrator immersed in the suspension. The vertical container is arranged in a chamber under reduced pressure. Under the action of vibration, the suspension is liquefied, and liquid phase is released therefrom due to reduced pressure to pass through the filtering walls.

This apparatus is simple in structure, it does not take much metal for construction, has a small filtering surface area and does not require much power.

It is, however, noted that with continuous operation of the apparatus, meshes of the filtering surface are clogged with solid particles due to insufficient regenerating action of vibrations. As a result, the filtering rate decreases and the degree of dehydration of suspension is lowered.

It is an object of the invention to eliminate the above disadvantages.

The main object of the invention is to provide an apparatus for dehydration of a continuously fed flow of suspension having a construction which eliminates clogging of meshes of the filtering surface.

Another object of the invention is to provide an apparatus for dehydration of a continuously fed flow of suspension in which the filtering rate is increased and degree of dehydration is improved.

These and other objects are accomplished due to the fact that in an apparatus for dehydration of a continuously fed flow of suspension comprising a vertical container which has pipes for feeding a suspension and for discharging a thickened suspension, respectively, and which is made converging from the top down and has filtering side walls for the passage of filtrate, a vibrator and a pipe for discharging filtrate, wherein, according to the invention, the vibrator is mounted outside the container and has vibration transmitting planes extending substantially along the filtering side walls in such a manner that they cooperate, during operation of the vibrator, with the filtering side walls to impart vibrations thereof.

This arrangement of the vibrator and its vibration transmitting planes enables the transmission of vibrations to the filtering side wall of the container. This facility provides for the effect of self-regeneration of the filtering surface, that is its continuous cleaning from solid particles of suspension so that continuous dehydration of suspension may be effected without cake formation which, in turn, provides for greater degree of filtering and higher filtering rate.

According to one embodiment of the invention, the vibration transmitting planes of the vibrator are arranged directly adjacent to the filtering side walls of the container and extend in parallel therewith.

This arrangement of the vibration transmitting planes enables an efficient transmission of vibrations along the entire length of the filtering surface of the wall without damaging it.

Longitudinally extending grooves are preferably provided in the vibration transmitting planes of the vibrator opposite to the filtering side walls to ensure most rapid flow of filtrate down the planes.

According to another embodiment of the invention, in case the container is formed by a cylinder having a solid wall and a truncated cone arranged coaxially therewith and mounted within the cylinder which is made of a filtering material to form the filtering side walls of the container, the vibration transmitting planes of the vibrator are provided inside the truncated cone along the height thereof and rigidly secured thereto, the truncated cone terminating, at the bottom, in a pipe for discharging filtrate.

Rigid connection of the truncated cone to the vibration transmitting planes enables uniform distribution of vibrations over the entire filtering surface thereof irrespective of the density of the suspension flow which varies along the height of the container.

The invention is further characterized in that the filtering side walls of the container are made of a woven material which exhibits sufficient flexibility for taking up vibrations.

The filtering side walls of the container are preferably inclined to the vertical axis thereof at an angle from 1 to 7.5° so as to provide for desired velocity of flow of filtrate through meshes of the filtering walls and to ensure required velocity of flow of finely divided viscous suspension within the container.

Due to the above features, the apparatus according to the invention ensures greater degree of filtering and higher degree of dehydration of continuously fed flow of suspension, with continuous and reliable operation.

BRIEF DESCRIPTION OF THE DRAWINGS

The invention will now be described in details with reference to the accompanying drawings illustrating the apparatus for dehydration of continuously fed flow of suspension, in which.

DESCRIPTION OF THE PREFERRED EMBODIMENTS

Figure 1:
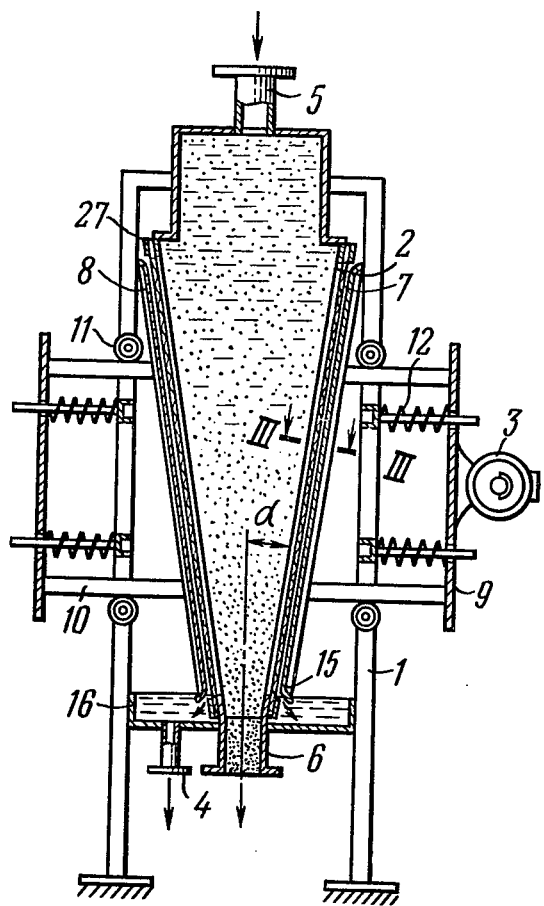
FIG. 1 is a longitudinal section view of an apparatus according to the invention.

The apparatus for dehydration of a continuously fed flow of suspension comprises a frame 1 (FIGS. 1, 2) supporting a vertical container 2, a vibrator 3 and a pipe 4 for draining filtrate.

The container 2 has a pipe 5 for continuously feeding a flow of a suspension thereto which is arranged at the top of the container, as well as a pipe 6 for discharging the thickened suspension which is arranged at the bottom of the container.

Figure 2:
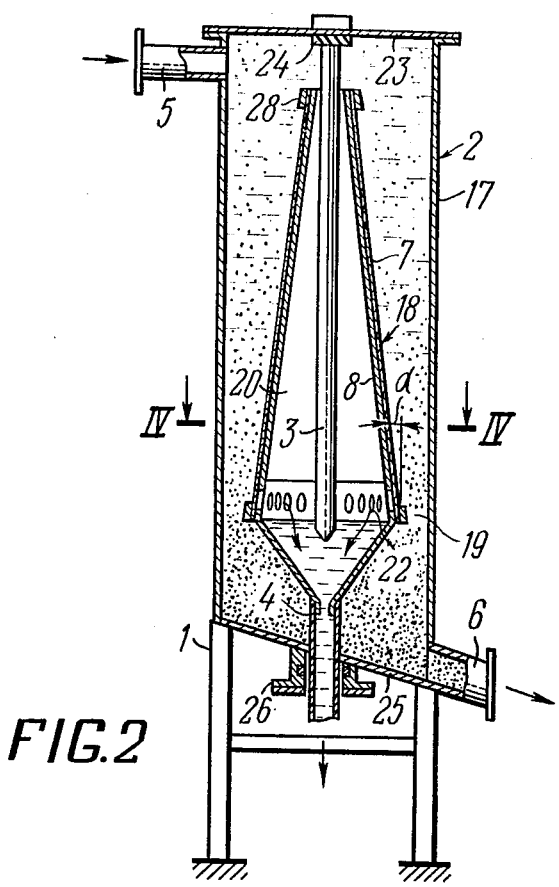
FIG. 2 is a longitudinal section of another embodiment of the apparatus.

The container 2 is made converging from top down, that is in the direction of suspension flow as shown in FIGS. 1 and 2, and has inclined filtering side walls 7 for the passage of filtrate.

Use can be made of any appropriate conventional source of vibrations, such as mechanical, pneumatic or electric in the vibrator 3.

The vibrator 3 is mounted outside the container 2 and has vibration transmitting planes 8 extending substantially along the filtering side walls 7 in such a manner that they cooperate, during operation of the vibrator, with the filtering side walls 7 to impart vibrations thereto.

In accordance with the embodiment shown in FIG. 1, the vibrator 3 is mounted on a framing 9, and its vibration transmitting planes are arranged directly adjacent to the filtering side walls 7 of the container 2 in parallel therewith, and during operation of the vibrator 3, the vibration transmitting planes 8 come into contact with the filtering side walls 7. It should be noted that the vibration transmitting planes 8 are connected to the vibrator 3 by means of rods 10 extending between guide rollers 11 of the frame 1. The framing 9 is connected to the frame 1 by means of shock absorbers 12.

Figure 3:
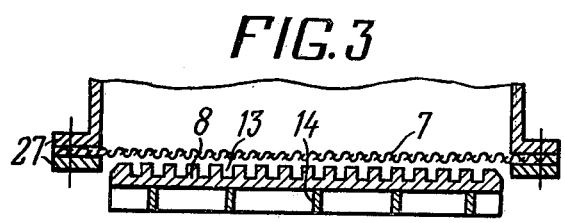
FIG. 3 is a section view taken along section line III—III in FIG. 1.

Longitudinally extending grooves 13 (FIG. 3) are provided in the vibration transmitting planes 8 of the vibrator 3 facing the filtering side walls 7, the vibration transmitting planes 8 having ridges 14. Ends 15 of the vibration transmitting planes 8 (FIG. 1) are bent outwards as shown in FIG. 1 to let the filtrate flow down and to eliminate damages of the filtering walls 7 during operation of the vibrator 3.

A collector 16 for collecting filtrate connected to the pipe 4 for draining filtrate is disposed under the container 2.

In accordance with another embodiment of the invention, the container 2 is of an annular cross-section (FIG. 3) and is formed by a cylinder 17 (FIG. 2) having a solid wall and a truncated cone 18 coaxial therewith which is mounted within the cylinder and made of a filtering material. The cylinder 17 forms the outer wall of the container 2, and the truncated cone 18 forms the inner wall of the container, the latter defining the filtering side wall 7 of the container 2 and determining its converging shape.

Thickened suspension is discharged through an annular aperture 19 communicating with the pipe 6.

In this embodiment, the vibrator 3 and its vibration transmitting planes 8 are arranged within the truncated cone 18 along the entire height thereof.

Figure 4:
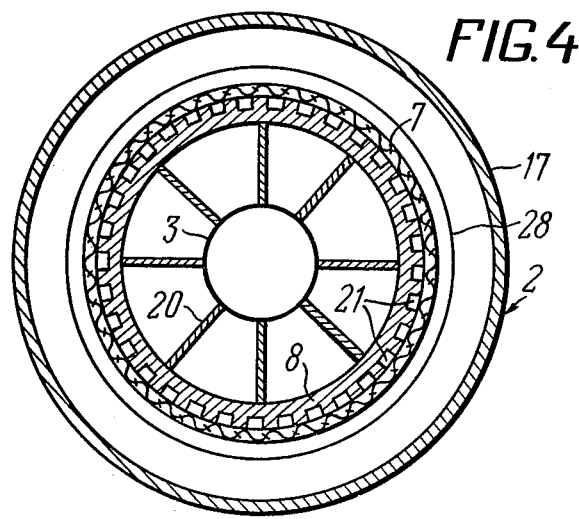
FIG. 4 is a section view taken along section line IV—IV in FIG. 2.

The vibration transmitting planes 8 are rigidly connected to the vibrator 3 and to the truncated cone 18 by means of ridges 20, the shape of the vibration transmitting planes 8 being identical with the shape of the filtering wall 7, and the planes 8 have longitudinally extending grooves 21 facing the filtering wall 7 (FIG. 4).

The truncated cone 18 (FIG. 1) terminates, at the bottom, in the pipe 4 for draining filtrate, the bottom portion of the vibration transmitting plane 8 being provided with openings 22 for draining filtrate from the grooves 21 into the interior of the truncated cone 18.

The vibrator 3 and the truncated cone 18 are suspended to a cover plate 23 of the cylinder 17 by means of shock absorbers 24.

The pipe 4 extends through an inclined bottom plate 25 of the cylinder 17 by means of any appropriate sealing device 26.

The filtering side walls 7 of the container 2 as shown in FIGS. 1 and 2, are made of a woven material, such as of polyamide or polypropylene, and are inclined at an angle $\alpha = 1$–$7.5°$ to the vertical axis of the container 2.

The filtering wall 7 of the container 2 (FIG. 1) is secured to the container by means of flanges 27.

The filtering wall 7 of the container 2 (FIG. 2) is secured to the vibration transmitting planes 8 by means of latches 28.

The apparatus functions in the following manner.

A flow of suspension is fed through the pipe 5 (FIGS. 1, 2) from the top to the vertical container 2 and flows down under gravity. Vibrations from the vibrator 3 are taken up by the vibration transmitting planes 8 which impart them to the filtering side walls 7.

Elastic waves of vibrations propagate at right angle to the suspension flow. Under the action of elastic waves of vibrations, solid particles of the suspension are displaced in the direction of propagation of vibrations, that is away from the filtering wall 7.

Liquid phase of suspension flows in the opposite direction, and filtrate obtained after the passage of liquid phase through the filtering wall 7 flows down along the vibration transmitting planes 8. The filtrate is drained from the apparatus via the pipe 4.

As the suspension descends within the container 2, it is thickened due to evacuation of water therefrom, and the suspension thickened to a required extent is discharged via the pipe 6, the feeding of suspension and discharging of filtrate and thickened suspension occurring in the directions indicated by arrows in FIGS. 1, 2.

The flow of filtrate flowing down the vibration transmitting planes 8 and filtering wall 7 during vibration partially passes back through the filtering wall 7 thereby cleaning its meshes. Therefore, self-regeneration, that is cleaning of the filtering surface takes place concurrently with filtering.

The provision of longitudinally extending grooves 13 (FIG. 3) and 21 (FIG. 4) in the vibration transmitting planes 8 accelerates the downflow of filtrate.

In the embodiment of the apparatus shown in FIGS. 2 and 4, in which the vibration transmitting planes 8 are rigidly connected to the filtering walls 7, vibrations are transmitted with different amplitudes of oscillations along the height of the suspension layer depending on the suspension density which varies with height. This improves the degree of dehydration of suspension.

Optimum efficiency of dehydration of the suspension is achieved with an angle of inclination of the filtering walls 7 within the range from 1 to 7.5°, that is with the provision of desired velocity of passage of liquid phase through meshes of the filtering surface.

Due to an increase in the filtering rate in the apparatus according to the invention, the degree of dehydration of suspension is improved.

What is claimed is:

1. An apparatus for dehydration of a continuously fed flow of suspension comprising: a vertical container made converging from top down; a pipe for continuously feeding a suspension to said container; an outlet of said container for discharging thickened suspension therefrom; filtering porous, frusto-conical sidewall means on said container for draining filtrate released from the suspension during its dehydration for obtaining thickened suspension; a vibrator mounted outside said container, frusto-conical vibration transmitting plane means connected to said vibrator contiguous to, parallel to, and spaced apart from said sidewall means for transmitting vibration to said filtering sidewall means during operation of the vibrator; vacuum producing means for continuously draining filtrate from between said sidewall means and said plane means.

2. An apparatus according to claim 1, wherein the vibration transmitting plane means of the vibrator are disposed directly adjacent to the filtering side wall means of the container in close parallel relationship therewith.

3. An apparatus according to claim 2, wherein the vibration transmitting plane means of the vibrator have longitudinally extending grooves opposite the filtering side wall means.

4. An apparatus according to claim 1, wherein the filtering side wall means of the container are made of a woven material.

5. An apparatus according to claim 4, wherein the filtering side wall means of the container are inclined at an angle from 1 to 7.5° to a vertical axis of the container.

6. Apparatus for dehydrating a continuously flowing suspension comprising, a vertical tubular container for filtering a continuous flow of a suspension, said container having a frusto-conical filtering sidewall means for removing filtrate from the suspension during flow thereof, a vibrator disposed externally of said container, a frusto-conical vibrating plane means connected to the vibrator for continuous vibration thereof disposed parallel to, contiguous to, and spaced apart from said filtering sidewall means for intermittently contacting the filtering sidewall means and imparting vibrations thereto to preclude clogging thereof to insure filtering of filtrate therethrough, means comprising said vertical container for receiving said continuous flow of a suspension, and means for continuously removing a thickened suspension upon removal of filtrate therefrom, and vacuum producing means for continuously draining the filtrate separately from the thickened suspension.

7. Apparatus for dehydrating a continuously flowing suspension according to claim 6, in which said container is disposed internally of said means for receiving said flow of a suspension, said vibrating plane means being disposed internally of said sidewall, and said sidewall means diverge downwardly.

8. Apparatus for dehydrating a continuously flowing suspension according to claim 6, in which said means for receiving said flow of a suspension is said container, and said means for continuously removing the thickened suspension is disposed circumferentially of said sidewall means.

9. Apparatus for dehydrating a continuously flowing suspension according to claim 6, in which said frusto-conical sidewall means are inclined relative to a vertical axis of said tubular container within a range of from 1° to 7.5°.